US012465792B2

(12) United States Patent
Krueger et al.

(10) Patent No.: US 12,465,792 B2
(45) **Date of Patent: *Nov. 11, 2025**

(54) IMPACT TOOLS

(71) Applicant: Uniqative LLC, Sylvania, OH (US)

(72) Inventors: David Krueger, Sylvania, OH (US); Robert Jacksy, Maumee, OH (US)

(73) Assignee: Uniqative LLC, Sylvania, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,446

(22) Filed: Jan. 29, 2024

(65) Prior Publication Data

US 2024/0245938 A1 Jul. 25, 2024

Related U.S. Application Data

(63) Continuation of application No. 18/135,216, filed on Apr. 17, 2023, now Pat. No. 11,883,691, which is a continuation of application No. 17/975,741, filed on Oct. 28, 2022, now Pat. No. 11,628,317, which is a continuation of application No. 16/834,034, filed on Mar. 30, 2020, now Pat. No. 11,583,705, which is a continuation of application No. 15/919,907, filed on Mar. 13, 2018, now Pat. No. 10,603,525.

(60) Provisional application No. 62/473,776, filed on Mar. 20, 2017.

(51) Int. Cl.
*A62B 3/00* (2006.01)
*B26F 3/00* (2006.01)

(52) U.S. Cl.
CPC ................ *A62B 3/00* (2013.01); *A62B 3/005* (2013.01); *B26F 3/00* (2013.01); *Y10T 225/30* (2015.04)

(58) Field of Classification Search
CPC ..... Y10T 225/329; Y10T 225/30; A62B 3/00; A62B 3/005; B26F 3/00
See application file for complete search history.

(56) References Cited

U.S. PATENT DOCUMENTS

| | | | |
|---|---|---|---|
| 2,521,703 | A | 9/1950 | Emmitt |
| 2,721,726 | A | 10/1955 | Johnson |
| 2,723,576 | A | 11/1955 | Molnar |
| 3,105,457 | A | 10/1963 | Kruger |
| 3,411,498 | A | 11/1968 | Reiter |

(Continued)

OTHER PUBLICATIONS

Chief Supply—ASP Window Breaker Breakaway Cap https://www.chiefsupply.com/asp-window-breaker-breakaway-cap-black.html, last visited Mar. 7, 2017.

(Continued)

*Primary Examiner* — Phong H Nguyen
(74) *Attorney, Agent, or Firm* — MacMillan, Sobanski & Todd, LLC

(57) ABSTRACT

An impact tool includes a core and a plurality of projections. The core is formed of a first material that has a first specific gravity and each projection is formed of a second material that has a second specific gravity. The plurality of projections is configured on the core such that at least two projections intersect a first hypothetical plane disposed on the first side of the core and at least two projections intersect a second hypothetical plane disposed on the second side of the core and that is opposably facing the first side. Each of the first and second hypothetical planes is disposed a distance from the central lengthwise axis of the core that is greater than the radius of the core and less than the sum of the radius of the core and the length of a projection.

20 Claims, 7 Drawing Sheets

(56) References Cited

U.S. PATENT DOCUMENTS

| | | | |
|---|---|---|---|
| 4,191,178 | A | 3/1980 | Wisnieski |
| 4,615,400 | A | 10/1986 | Bodine |
| D301,161 | S | 5/1989 | Dunse |
| 5,066,018 | A | 11/1991 | Hinton |
| 5,199,716 | A | 4/1993 | DeFluiter et al. |
| 5,261,306 | A | 11/1993 | Morey et al. |
| 5,413,551 | A | 5/1995 | Wu |
| 5,641,214 | A | 6/1997 | Kafka |
| 5,657,543 | A | 8/1997 | Collins |
| D393,671 | S | 4/1998 | Honaker |
| 5,791,056 | A | 8/1998 | Messina |
| D401,365 | S | 11/1998 | Liu |
| D431,848 | S | 10/2000 | Hubbard |
| 6,223,441 | B1 | 5/2001 | Parsons |
| 6,383,092 | B1 | 5/2002 | Ogg |
| 6,443,863 | B1 | 9/2002 | Dinoffer |
| 6,464,429 | B2 | 10/2002 | Moore |
| 6,533,637 | B1 | 3/2003 | Liao |
| 6,761,846 | B2 | 7/2004 | Murphy |
| 7,396,086 | B1 | 7/2008 | Hall et al. |
| 7,458,945 | B2 | 12/2008 | Zemont |
| 7,887,211 | B2 | 2/2011 | Summers |
| 8,205,351 | B2 | 6/2012 | Howe et al. |
| 8,579,741 | B2 | 11/2013 | Heland |
| 8,608,600 | B2 | 12/2013 | Naum |
| 10,603,525 | B2 | 3/2020 | Krueger et al. |
| 11,583,705 | B2 | 2/2023 | Krueger et al. |
| 11,628,317 | B2 | 4/2023 | Krueger et al. |
| 11,883,691 | B2 | 1/2024 | Krueger et al. |
| 2006/0060030 | A1 | 3/2006 | Lowder |
| 2006/0063623 | A1 | 3/2006 | Zheng |
| 2006/0081673 | A1 | 4/2006 | Schenk et al. |
| 2007/0270233 | A1 | 11/2007 | Ruston |
| 2008/0017009 | A1 | 1/2008 | Setliff |
| 2009/0300933 | A1 | 12/2009 | Howe et al. |
| 2010/0122620 | A1 | 5/2010 | Ruthven et al. |
| 2013/0250047 | A1 | 9/2013 | Hollinger |
| 2014/0111608 | A1 | 4/2014 | Pfeil |
| 2014/0262537 | A1 | 9/2014 | Xia et al. |
| 2016/0237752 | A1 | 8/2016 | Jones |
| 2017/0096859 | A1 | 4/2017 | Spencer |
| 2023/0047493 | A1 | 2/2023 | Krueger et al. |

OTHER PUBLICATIONS

The Met—Military Flail https://www.metmuseum.org/art/collection/search/33866, visited Jun. 26, 2023.

Murrell, “Weapons”, Copyright 2009, by Amber Books, Ltd.

Royal Armouries Collections—Flail https://collections.royalarmouries.org/object/rac-object-1589, visited Jun. 26, 2023.

Outfit 4 Events—Flail with spiked iron ball https://www.outfit4events.com/eur/product/884-flail-with-spiked-iron-ball/ visited Jun. 14, 2023.

Website page www.by-the-sword.com/p-2463-morning-star-flail.aspx obtained from archive.org on Aug. 14, 2023.

Website page www.by-the-sword.com/p-4979-single-ball-flail.aspx obtained from archive.org on Aug. 14, 2023.

Website page www.by-the-sword.com/p-2467-classic-flail.aspx obtained from archive.org on Aug. 14, 2023.

Mace from the Royal Armouries Collections, printed from https://collections.royalarmouries.org/object/trac-object-9483.html on Aug. 14, 2023.

IMPACT TOOLS

RELATED APPLICATIONS

This application is a continuation of U.S. Nonprovisional application Ser. No. 18/135,216, filed Apr. 17, 2023, which is a continuation of U.S. Nonprovisional application Ser. No. 17/975,741, filed Oct. 28, 2022, now U.S. Pat. No. 11,628,317, which is a continuation of U.S. Nonprovisional application Ser. No. 16/834,034, filed Mar. 30, 2020, now U.S. Pat. No. 11,583,705, which is a continuation of U.S. Nonprovisional application Ser. No. 15/919,907, filed on Mar. 13, 2018, now U.S. Pat. No. 10,603,525, which claims the benefit of U.S. Provisional Application No. 62/473,776, filed on Mar. 20, 2017. The entire disclosure of each of these related applications is hereby incorporated into this disclosure by reference.

FIELD

The disclosure relates generally to the field of tools. More particularly, the disclosure relates to impact tools.

BACKGROUND

In emergency situations, it is sometimes necessary to gain access to an environment that is not openly accessible. For example, when an automobile is involved in an accident, it may be necessary to break the glass of the automobile to gain access to the automobile's interior and anyone inside the automobile. In another example, when emergency rescue personnel are positioned within a structure, such as a house or commercial building, with no safe exits available, it may be necessary to break the glass of a window to create an exit through which the emergency rescue personnel can exit the structure. When breaking glass to provide access to an environment, it is desirable to both protect the individual breaking the glass such that they are not exposed to shards of glass and to prevent exposure to potential hazards that may exist within the environment the individual is attempting to gain access.

Current devices that are utilized to break glass and provide access to an environment are handheld, which require the individual utilizing the device to break the glass while standing adjacent to the glass and holding the device. This can result in injury to the individual by broken glass becoming embedded in the individual's body or as a result of the manual force required to advance the handheld device through the glass. Furthermore, current devices prevent the individual from breaking glass while positioned a distance from the glass in instances in which a fire or other hazardous situation exists in the environment within which the individual is attempting to gain access.

Therefore, a need exists for new and useful impact tools.

SUMMARY OF SELECTED EXAMPLE EMBODIMENTS

Various impact tools are described herein.

An example impact tool includes a core and a plurality of projections. The core has a radius, a center, a central lengthwise axis, a first side, a second side opposably facing the first side of the core relative to the central lengthwise axis, and is formed of a first material that has a first specific gravity. Each projection of the plurality of projections is attached to the core and has a first end, a second end, a length that extends from the first end to the second end, and is formed of a second material that has a second specific gravity. The second material is different than the first material. The plurality of projections is configured on the core such that at least two projections intersect a first hypothetical plane that is disposed on the first side of the core and at least two projections intersect a second hypothetical plane that is different than the first hypothetical plane and is disposed on the second side of the core. Each of the first hypothetical plane and the second hypothetical plane is free of contact with the core and is disposed a distance from the center of the core that is greater than the radius of the core and less than the sum of the radius of the core and the length of a projection of the plurality of projections. Each of the first specific gravity and the second specific gravity is greater than 2.5.

Another example impact tool includes a core and a plurality of projections. The core has a radius, a center, a central lengthwise axis, a first side, a second side opposably facing the first side of the core relative to the central lengthwise axis, and is formed of a first material that has a first specific gravity. Each projection of the plurality of projections is attached to the core and has a first end, a second end, a length that extends from the first end to the second end, a main body, and a tip. The main body is formed of a second material and the tip is formed of a third material that is different than the second material. The third material is different than the first material and has a second specific gravity that is different than the first specific gravity. The plurality of projections is configured on the core such that at least two projections intersect a first hypothetical plane that is disposed on the first side of the core and at least two projections intersect a second hypothetical plane that is different than the first hypothetical plane and is disposed on the second side of the core. Each of the first hypothetical plane and the second hypothetical plane is free of contact with the core, extends parallel to the central lengthwise axis of the core, and is disposed a distance from the center of the core that is greater than the radius of the core and less than the sum of the radius of the core and the length of a projection of the plurality of projections. Each of the first specific gravity and the second specific gravity is greater than 2.5.

Another example impact tool includes a core and a plurality of projections. The core has a radius, a center, a central lengthwise axis, a first side, a second side opposably facing the first side of the core relative to the central lengthwise axis, and is formed of a first material that has a first specific gravity. The core is a solid sphere formed of a metal. Each projection of the plurality of projections is releasably attached to the core and has a first end, a second end, a length that extends from the first end to the second end, a main body, and a tip. The main body is formed of a second material and the tip is formed of a third material that is different than the second material. The third material is different than the first material and has a second specific gravity that is different than the first specific gravity. The plurality of projections is configured on the core such that at least two projections intersect a first hypothetical plane that is disposed on the first side of the core and at least two projections intersect a second hypothetical plane that is different than the first hypothetical plane and is disposed on the second side of the core. Each of the first hypothetical plane and the second hypothetical plane is free of contact with the core, extends parallel to the central lengthwise axis of the core, and is disposed a distance from the center of the core that is greater than the radius of the core and less than the sum of the radius of the core and the length of a projection of the plurality of projections. Each projection of the plurality of projections is equally spaced from more than one immediately adjacent projections of the plurality of projections and includes a hard edge. Each of the first specific gravity and the second specific gravity is greater than 2.5.

Additional understanding of the example impact tools can be obtained by review of the detailed description, below, and the appended drawings.

DETAILED DESCRIPTION

The following detailed description and the appended drawings describe and illustrate various example embodiments of impact tools. The description and illustration of these examples are provided to enable one skilled in the art to make and use an impact tool. They are not intended to limit the scope of the claims in any manner.

As used herein, the term "radius" refers to the length of a straight line passing from the center of a body, element, or feature to an exterior surface of the body, element, or feature, and does not impart any structural configuration on the body, element, or feature.

As used herein, the phrase "specific gravity" refers to the ratio of density of a material to the density of water at four degrees Celsius.

As used herein, the term "damage" and grammatically related terms refers to shattering, cracking, fracturing, fragmenting, scoring, cutting, breaking, perforating, disrupting, penetrating, and/or puncturing.

As used herein, the phrase "hard edge" refers to a point, such as the point of a cone or another three-dimensional object, and/or an intersection between two surfaces, such as the intersection between two surfaces of a cube or another three-dimensional object. While examples of hard edges have been provided, these examples are not limiting in nature as a hard edge can be defined by any suitable structure.

Figure 1:
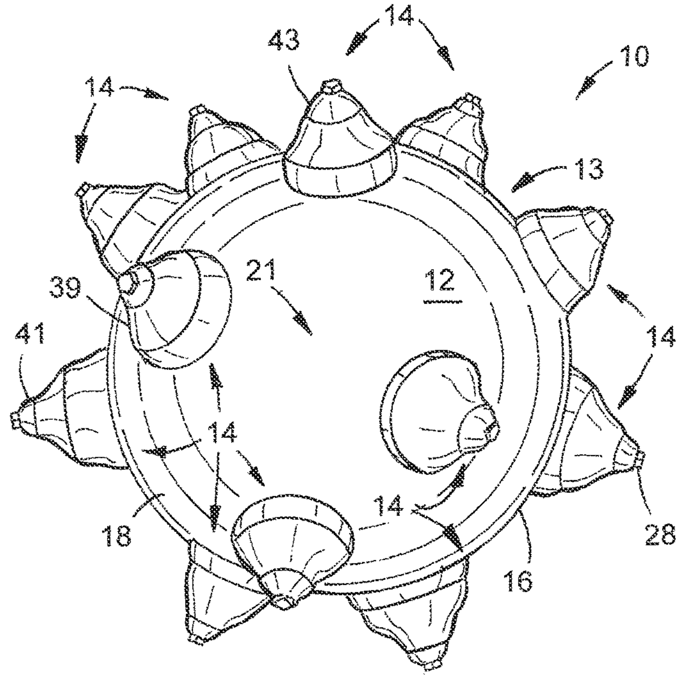
FIG. 1 is a perspective view of an example impact tool.
Figure 2:
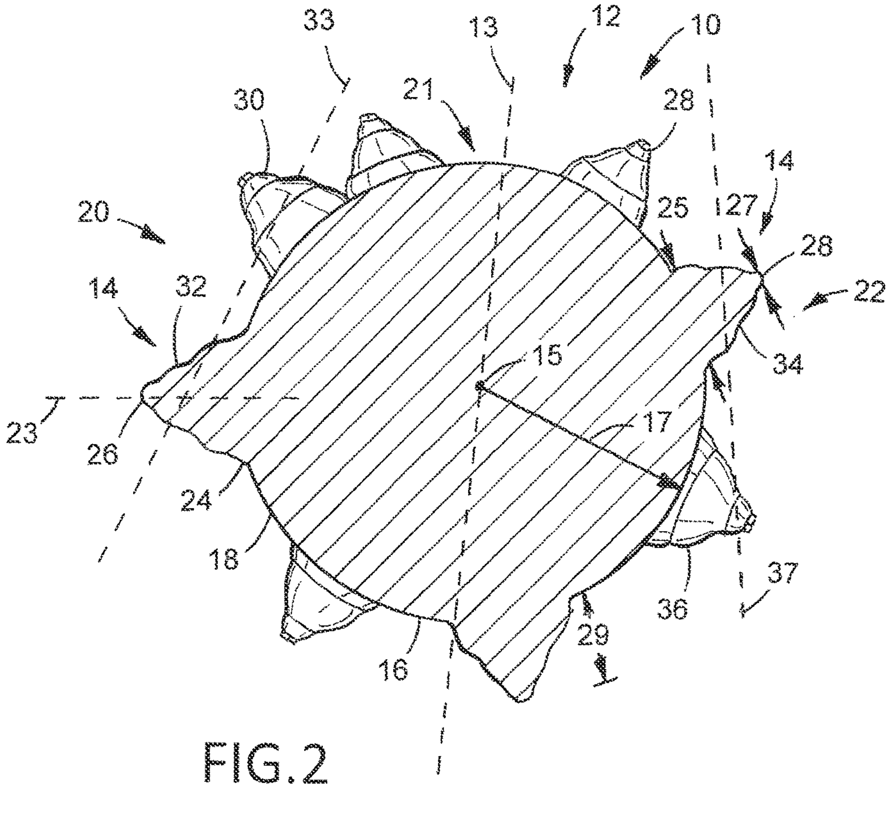
FIG. 2 is a cross-sectional view of the impact tool illustrated in FIG. 1 taken along a central lengthwise axis of the impact tool.

FIGS. 1 and 2 illustrate a first example impact tool 10. The impact tool 10 includes a core 12 and a plurality of projections 14.

In the illustrated embodiment, the core 12 has a central lengthwise axis 13, a center 15, a main body 16, a radius 17, an exterior surface 18, a first side 20, a second side 22 opposably facing the first side 20 relative to the central lengthwise axis 13, and is formed as a solid sphere 21. The central lengthwise axis 13 extends through the core 12 and the center 15 of the core 12. The radius 17 extends from the center 15 to the exterior surface 18. In the illustrated embodiment, the core 12 is formed of a first material that has a first specific gravity and a first hardness.

While the core 12 has been illustrated as a solid sphere 21, a core can have any suitable structural configuration and selection of a suitable structural configuration for a core can be based on various considerations, including the type of material that forms a projection intended to be attached to a core. Examples of suitable structural configurations considered suitable to form a core include spheres, cubes, cuboids, pyramids, cylinders, hexagonal prisms, triangular prisms, cones, rectangular prisms, configurations that are solid, configurations that are hollow and define a chamber that is accessible from an environment exterior to the chamber, configuration that are hollow and define a chamber that is not accessible from an environment exterior to the chamber, and any other structural configuration considered suitable for a particular embodiment.

A core formed as a sphere can have any suitable radius and selection of a suitable radius for a spherical core can be based on various considerations, including the size and configuration of a projection intended to be disposed on the core. Examples of radiuses considered suitable for a spherical core include cores that have a radius that is equal to, less than, greater than, or about 0.25 inches, 0.5 inches, 0.75 inches, 1.0 inch, 1.25 inches, 1.5 inches, 1.75 inches, 2.0 inches, 2.25 inches, 2.5 inches, between about 0.25 inches and about 2.5 inches, and any other radius considered suitable for a particular embodiment. In the illustrated embodiment, the core 12 has a radius 17 equal to about 1.0 inch. Cores formed of non-spherical shapes can similarly have any suitable dimension or dimensions, which can be selected on similar considerations.

Each projection of the plurality of projections 14 extends from the core 12 and has a lengthwise axis 23, a first end 24, a second end 26, a first diameter 25 at the first end 24, a second diameter 27 at the second end 26, a length 29 that extends from the first end 24 to the second end 26, and a solid cross-sectional shape. The first diameter 25 is greater than the second diameter 27 such that the diameter of each projection of the plurality of projections 14 diminishes (e.g., tapers) from the first end 24 toward the second end 26. Each projection of the plurality of projections 14 is formed of a second material that has a second specific gravity and a second hardness. In the illustrated embodiment, the second material is the same as the first material, the second specific gravity is the same as the first specific gravity, and the second hardness is the same as the first hardness.

The second end 26 of each projection of the plurality of projections 14 is configured such that it defines at least one hard edge 28. It is considered advantageous to include at least one hard edge 28 on each projection of the plurality of projections at least because the hard edge 28 provides a mechanism for increasing the likelihood of the impact tool 10 damaging the material that forms the surface intended to be contacted by the impact tool 10.

Each projection of the plurality of projections 14 is equally spaced from more than one immediately adjacent projections of the plurality of projections 14. For example, projection 39 is equally spaced from projection 41 and projection 43. The plurality of projections 14 is configured on the core 12 such that at least two projections (e.g., a first projection 30 of the plurality of projections 14 and a second projection 32 of the plurality of projections 14) intersect a first hypothetical plane 33 disposed on the first side 20 of the core 12 and at least two projections (e.g., a third projection 34 of the plurality of projections 14 and a fourth projection 36 of the plurality of projections 14) intersect a second hypothetical 37 plane disposed on the second side 22 of the core 12. Each of the first hypothetical plane 33 and the second hypothetical plane 37 does not contact the core 12 and is disposed a distance from the center 15 of the core 12 that is greater than the radius 17 of the core 12 and less than the sum of the radius 17 of the core 12 and the length 29 of a projection of the plurality of projections 14.

It is considered advantageous to utilize an impact tool 10 that has a plurality of projections 14 positioned as described herein at least because such an impact tool provides a mechanism for damaging glass, or any other suitable material, from a position that is disposed a distance from the glass (e.g., more than one yard away from the material intended to be damaged). For example, the impact tools described herein provide increased handleability relative to other tools used to damage glass and can be utilized by throwing the impact tool at a material intended to be damaged. Unlike other devices, the impact tools described herein provide a mechanism for ensuring that at least two projections of a plurality of projections contact a surface that the impact tool is thrown at such that the material forming the surface can be damaged by the impact tool.

An impact tool, a core, and each projection of the plurality of projections can be formed using any suitable technique or method of manufacture and selection of a suitable technique or method of manufacture to form an impact tool, a core, and/or a projection can be based on various considerations, including the intended use of the impact tool. Examples of suitable techniques and methods of manufacturing an impact tool, a core, and/or a projection include casting, forming, forging, and any other technique or method of manufacture considered suitable for a particular embodiment. In the illustrated embodiment, the impact tool 10 can be formed by casting the impact tool 10.

A core, a projection, a portion of a plurality of projections, and/or each projection of a plurality of projections can be formed of any suitable material having any suitable specific gravity and hardness. Selection of a suitable material, specific gravity, and/or hardness for a material that forms a core, a projection, a portion of a plurality of projections, and/or each projection of a plurality of projections can be based on various considerations, including the intended use of an impact tool of which the core, the projection, the portion of the plurality of projections, or each projection of the plurality of projections will be included. Examples of materials considered suitable to form a core, a projection, a portion of a plurality of projections, and/or each projection of a plurality of projections include gold, silver, aluminum, zinc, copper, platinum, iron, nickel, steel, such as stainless steel, carbon steel, and hardened steel, glass, cobalt, titanium, chromium, silicon, a ceramic, such as cordierite, silicon nitride, a carbide, such as silicon carbide, tungsten carbide, cemented metal carbide, alumina, and zirconia, diamond, polycrystalline diamond, an alloy, polymers, materials that are buoyant, combinations of the materials described herein, and/or any other material considered suitable for a particular embodiment. Examples of specific gravities of materials considered suitable to form a core, a projection, a portion of a plurality of projections, and/or each projection of a plurality of projections include specific gravities equal to, greater than, less than, or about 2.0, 2.33, 2.45, 2.5, 2.6, 2.72, 2.8, 3.2, 3.51, 3.9, 4.506, 6.0, 6.9, 7.03, 7.13, 7.2, 7.7, 7.8, 7.83, 7.8, 8.71, 8.89, 8.9, 10.5, 19.32, 21.45, between about 2.0 and about 22.0, between about 2 and about 3, between about 5.0 and about 17.0, between about 10.0 and about 12.0, and any other specific gravity considered suitable for a particular embodiment. Examples of hardnesses of materials considered suitable to form a core, a projection, a portion of a plurality of projections, and/or each projection of a plurality of projections include hardnesses that are measured using Mohs Hardness Scale that are equal to, less than, greater than, or about 2.0, 2.5, 2.9, 3.0, 4.0, 4.3, 4.5, 5.0, 6.0, 6.5, 7.0, 7.5, 8.0, 8.5, 9.0, 9.5, 10, between about 2.0 and about 10.0, between about 3.0 and about 9.0, between about 4.0 and 8.0, between about 5.0 and about 7.0, between about 8.5 and 9.5, about 6.0, and any other hardnesses considered suitable for a particular embodiment.

While each projection of the plurality of projections has been described as being formed of the same material that forms the core, a projection, a portion of a plurality of projections, or each projection of a plurality of projections can be formed of any suitable material and selection of a suitable material to form a projection, a portion of a plurality of projections, or each projection of a plurality of projections can be based on various considerations, including the intended use of an impact tool. Examples of materials considered suitable to form a projection, a portion of a plurality of projections, or each projection of a plurality of projections include a second material that is the same as the first material, a second material that is different than the first material, a second material that has the same specific gravity as the first material, a second material that has a specific gravity that is different than the first material, a second material that has the same hardness as the first material, a second material that has a hardness that is different than the hardness of the first material, and any other material considered suitable for a particular embodiment. For example, a first projection of a plurality of projections, or a first set of projections of a plurality of projections, can be formed of a second material and a third projection of a plurality of projections, or a second set of projection of a plurality of projections, can be formed of a third material that can be the same as the second material or different than the second material.

While the impact tool 10 has been illustrated as having a plurality of projections 14, an impact tool can include any suitable number of projections and selection of a suitable number of projections to include on an impact tool can be based on various considerations, including the intended use of the impact tool. Examples of numbers of projections considered suitable to include on an impact tool include one, at least one, two, a plurality, three, four, five, six, seven, eight, nine, ten, eleven, twelve, thirteen, fourteen, fifteen, more than fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, and any other number of projections considered suitable for a particular embodiment.

While the plurality of projections 14 has been illustrated as configured such that at least two projections (e.g., a first projection 30 of the plurality of projections 14 and a second projection 32 of the plurality of projections 14) intersect a first hypothetical plane 33 disposed on the first side 20 of the core 12 without contacting the core 12 and at least two projections (e.g., a third projection 34 of the plurality of projections 14 and a fourth projection 36 of the plurality of projections 14) intersect a second hypothetical 37 plane disposed on the second side 22 of the core 12 without contacting the core 12, the projections of a plurality of projections can be configured in any suitable manner. Selection of a suitable manner to configure a plurality of projections can be based on various considerations, such as the intended use of an impact tool on which the plurality of projections is disposed. Examples of configurations considered suitable for a plurality of projections include such that one, at least one, two, at least two, a plurality, three, four, five, six, or more than six projections of a plurality of projections intersect a first hypothetical plane disposed on a first side of a core without contacting the core and at least two projections intersect a second hypothetical plane disposed on a second side of the core without contacting the core and that is opposably facing the first side relative to the central lengthwise axis, such that one, at least one, two, at least two, a plurality, three, four, five, six, or more than six projections of a plurality of projections intersect a first hypothetical plane disposed on a first side of a core and at least two projections intersect a second hypothetical plane disposed on a second side of the core and that is opposably facing the first side relative to the central lengthwise axis, such that each, or one, of a first hypothetical plane and a second hypothetical plane extends parallel to, at an angle to (e.g., between about 0 degrees and about 180 degrees), or orthogonal to a central lengthwise axis of a core and is disposed a distance from the center of a core that is greater than a radius of the core and less than the sum of the radius of the core and a length of a projection of a plurality of projections, and any other configuration considered suitable for a particular embodiment.

While each projection of the plurality of projections 14 has been illustrated as including at least one hard edge 28, a projection, a portion of a plurality of projections, or each projection of a plurality of projections can include any suitable number of hard edges and selection of a suitable number of hard edges to include on a projection, a portion of a plurality of projections, or each projection of a plurality of projections can be based on various considerations, including the material forming the surface intended to be contacted by an impact tool. Examples of numbers of hard edges considered suitable to include on a projection, a portion of a plurality of projections, or each projection of a plurality of projections include at least one, one, two, a plurality, three, four, five, six, seven, eight, nine, ten, such that the second end of a projection, a portion of a plurality of projection, or each projection of a plurality of projections, is multifaceted, such that a projection, a portion of a plurality of projections, or each projection of a plurality of projections defines one or more hard edges between the first end and the second end of the projection, and any other number of hard edges considered suitable for a particular embodiment. While a hard edge has been illustrated as included on each projection of the plurality of projections, a projection can alternatively, or in combination with a hard edge, include a rounded point, or any other structure that provides a mechanism for damaging a surface intended to be contacted by a projection of the plurality of projections.

While each projection of the plurality of projections 14 has been illustrated as having a first diameter 25 that is greater than the second diameter 27 such that the diameter of each projection of the plurality of projections 14 diminishes (e.g., tapers) from the first end 24 toward the second end 26, each projection included on an impact tool can have any suitable structural arrangement. Selection of a suitable structural arrangement for a projection included on an impact tool can be based on various considerations, including the intended use of the impact tool. Examples of structural arrangements considered suitable for a projection include projections that have a first diameter at a first end of the projection that is greater than a second diameter at a second end of the projection such that the diameter of the projection diminishes (e.g., tapers) from the first end toward the second end, a first diameter at a first end of the projection that is less than a second diameter at a second end of the projection such that the diameter of the projection diminishes (e.g., tapers) from the second end toward the first end, a first diameter at a first end of the projection that is equal to, or substantially equal to, a second diameter at a second end of the projection, projections that are hollow and define a chamber that is accessible from an environment exterior to the chamber, projections that are hollow and define a chamber that is not accessible from an environment exterior to the chamber, and any other structural arrangement considered suitable for a particular embodiment.

Figure 3:
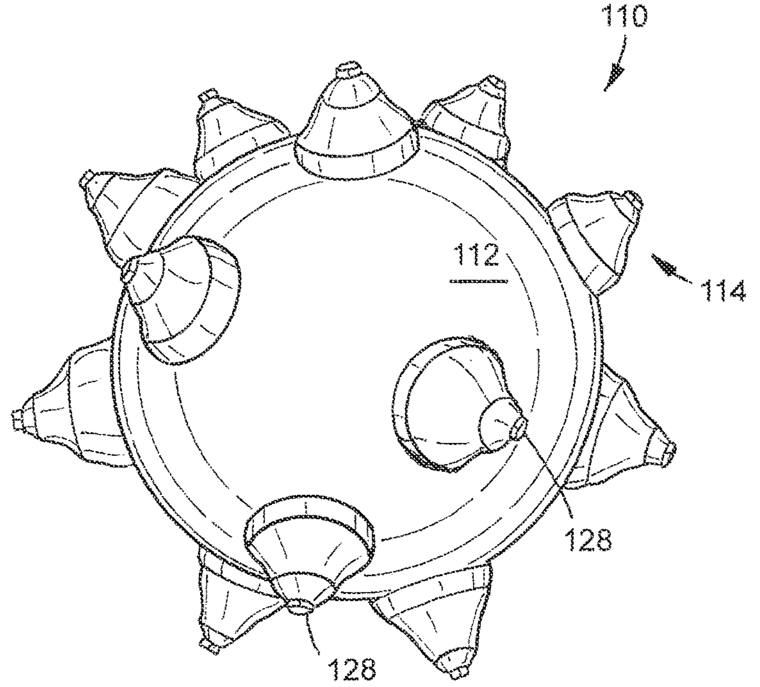
FIG. 3 is a perspective view of a second example impact tool.
Figure 4:
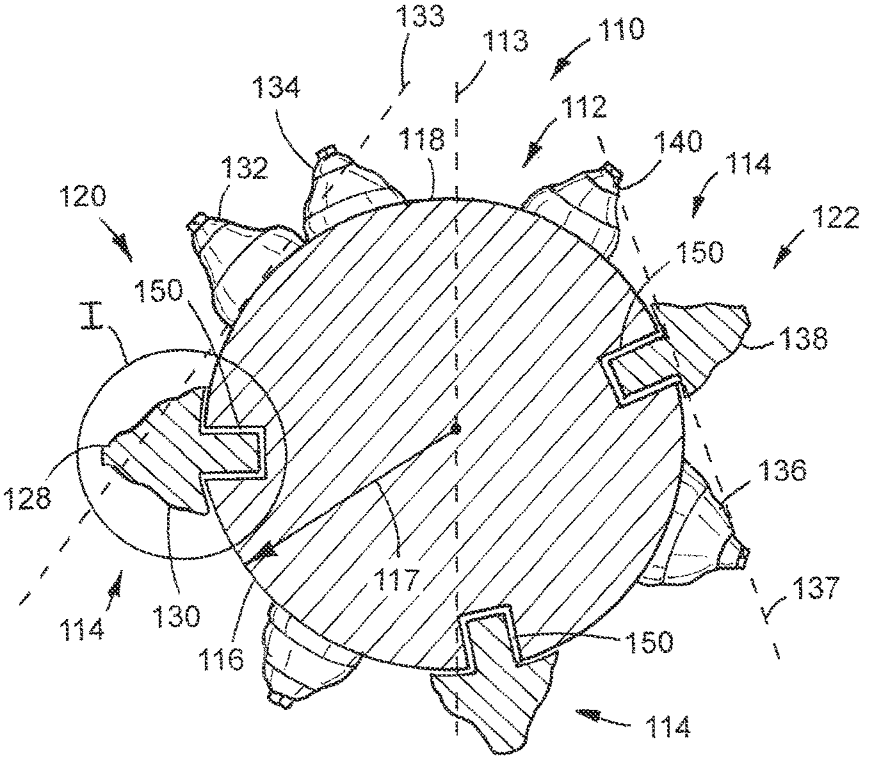
FIG. 4 is cross-sectional view of the impact tool illustrated in FIG. 3 taken along a central lengthwise axis of the impact tool.
Figure 5:
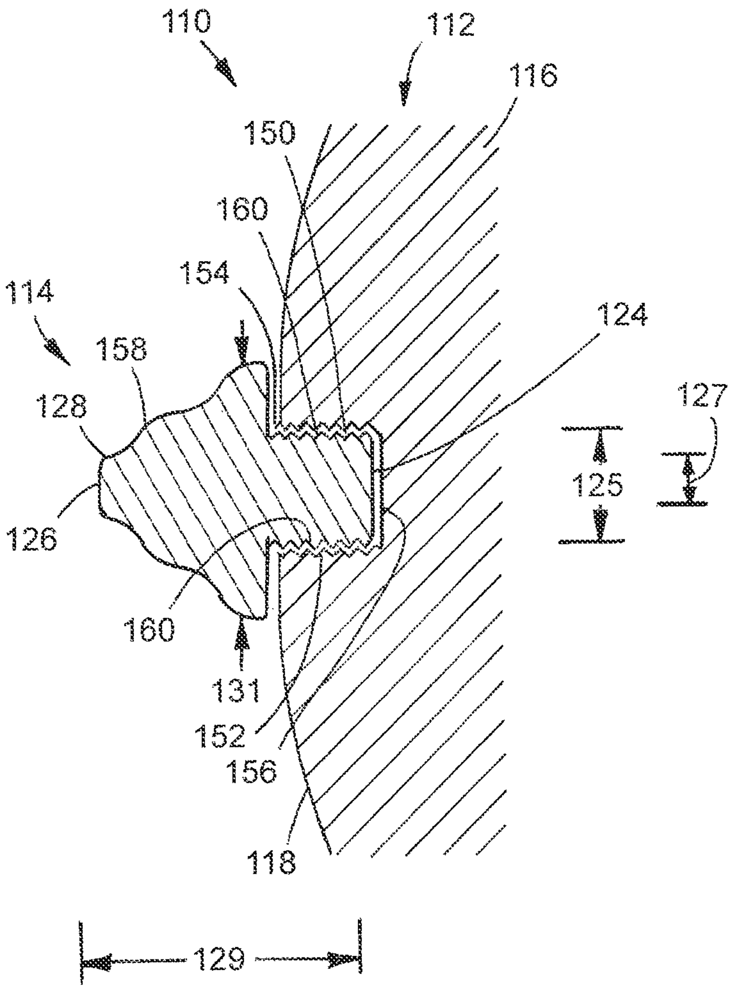
FIG. 5 is a magnified view of Area I shown in FIG. 4.

FIGS. 3, 4, and 5 illustrate a second example impact tool 110. The impact tool 110 is similar to the impact tool 10 illustrated in FIGS. 1 and 2 and described above, except as detailed below. The impact tool 110 includes a core 112 and a plurality of projections 114.

In the illustrated embodiment, the core 112 is formed of a first material that has a first specific gravity and a first hardness and each projection of the plurality of projections 114 is formed of a second material that is different than the first material and that has a second specific gravity that is different than the first specific gravity and a second hardness that is different than the first hardness.

As shown in FIG. 5, the main body 116 of the core 112 defines a plurality of recesses 150 and a thread 152 within each recess of the plurality of recesses 150. Each recess of the plurality of recesses 150 extends from the exterior surface 118 of the core 112 and into the main body 116 (e.g., toward the center of the core). Each recess of the plurality of recesses 150 has an opening 154, a recess base 156, and is sized and configured to receive a portion of a projection of the plurality of projections 114. The thread 152 defined within each recess of the plurality of recesses 150 extends from the exterior surface 118 of the core 112 and toward the recess base 156 and is sized and configured to mate and interact with a thread 160 defined by a projection of the plurality of projections 114, as described in more detail herein.

A recess defined by the main body of a core can have any suitable size and structural arrangement so long as it is sized and configured to receive a portion of a projection of a plurality of projections. Selection of a suitable size and structural arrangement for a recess can be based on various considerations, including the size and configuration of a projection intended to be partially disposed within the recess. Examples of sizes and structural arrangements considered suitable for a recess include recesses that have a diameter measured orthogonal to an axis that extends from the center of a core and through the center of the opening of a recess that is equal to, less than, greater than, or about 2.0 millimeters, 3.0 millimeters, 4.0 millimeters, 5.0 millimeters, 6.0 millimeters, 7.0 millimeters, between about 2.0 millimeters and about 7.0 millimeters, recesses that have a depth measured from the exterior surface of a core to a recess base that is equal to, less than, greater than, or about 7.0 millimeters, 8.0 millimeters, 9.0 millimeters, 10.0 millimeters, 11.0 millimeters, 12.0 millimeters, between about 7.0 millimeters and about 12.0 millimeters, and any other size or configuration considered suitable for a particular embodiment. Alternatively, a passageway can be drilled through the entire diameter of a core such that one projection or two projections can be attached within the passageway, as described herein with respect to attachment of a projection and a recess.

In the illustrated embodiment, each projection of the plurality of projections 114 is releasably attached to the core 114 and a projection of the plurality of projections 114 is partially disposed within each recess of the plurality of recesses 150 defined by the core 112. Each projection of the plurality of projections 114 is a separate member releasably attached to the core 112 and has a first end 124, a second end 126, a first diameter 125 at the first end 124, a second diameter 127 at the second end 126, a length 129 that extends from the first end 124 to the second end 126, a third diameter 131 disposed between the first end 124 and the second end 126, and a main body 158 that defines a thread 160. The first diameter 125 is greater than the second diameter 127 and less than the third diameter 131. The third diameter 131 is greater than the second diameter 127 such that the diameter of each projection of the plurality of projections 114 diminishes (e.g., tapers) from a location between the first end 124 and the second end 126 toward the second end 126. The thread 160 extends from the first end 124 toward the second end 126 and is sized and configured to mate and interact with a thread 152 defined by the main body of the core 112.

The second end 126 of each projection of the plurality of projections 114 is configured as an octagon such that the second end 126 defines a plurality of hard edges 128 between the second end 126 and a portion of the projection that extends from the second end 126 toward the first end 124. It is considered advantageous to include a plurality of hard edges 128 on each projection of the plurality of projections 114 at least because the plurality of hard edges 128 provides a mechanism for increasing the ability of the impact tool 110 to damage the material that forms the surface intended to be contacted by the impact tool 110.

In the illustrated embodiment, the plurality of projections 114 is configured on the core 112 such that at least three projections (e.g., a first projection 130 of the plurality of projections 114, a second projection 132 of the plurality of projections 114, a third projection 134 of the plurality of projections 114) intersect a first hypothetical plane 133 disposed on the first side 120 of the core 112 and at least three projections (e.g., a fourth projection 136 of the plurality of projections 114, a fifth projection 138 of the plurality of projections 114, and a sixth projection 140 of the plurality of projections 114) intersect a second hypothetical 137 plane disposed on the second side 122 of the core 112 and that is opposably facing the first side 118 relative to the central lengthwise axis 113. Each of the first hypothetical plane 133 and the second hypothetical plane 137 does not contact the core 112 and is disposed a distance from the central lengthwise axis 113 that is greater than the radius 117 of the core 112 and less than the sum of the radius 117 of the core 112 and the length 129 of a projection of the plurality of projections 114. Alternatively, each of a first hypothetical plane and a second hypothetical plane can be positioned such that it does not contact a core and is disposed a distance from a central lengthwise axis that is greater than a radius of the core and less than the sum of the radius of the core and a length of a projection of the plurality of projections that extends from an outer surface of the core and a second end of the projection.

Each projection of the plurality of projections 114 is equally spaced from more than one immediately adjacent projections of the plurality of projections 114 and each recess of the plurality of recesses 150 is equally spaced from more than one immediately adjacent recesses of the plurality of recesses 150. While the plurality of projections 114 and the plurality of recesses 150 have been illustrated in a particular configuration, a plurality of projections and a plurality of recesses can be configured on a core in any suitable configuration. Selection of a suitable configuration to position a plurality of projections and a plurality of recesses can be based on various considerations, including the intended use of an impact tool on which a plurality of projections is included. Examples of suitable configurations to position a plurality of projections include such that each projection of the plurality of projections is equally spaced from more than one immediately adjacent projections of the plurality of projections, such that each projection of the plurality of projections is equally spaced from more than two, three, four, or five immediately adjacent projections of the plurality of projections, such that each projection of the plurality of projections is equally spaced from five immediately adjacent projections of the plurality of projections, such that each projection of the plurality of projections is equally spaced from more than five immediately adjacent projections of the plurality of projections, each projection of the plurality of projections is not equally spaced from more than one immediately adjacent projections of the plurality of projections, each projection of the plurality of projections is equally spaced from all immediately adjacent projections of the plurality of projections, each projection of the plurality of projections is not equally spaced from all immediately adjacent projections of the plurality of projections, a first projection is disposed a first distance from a second projection and the second projection is disposed a second distance that is different than the first distance from a third projection, and any other configuration considered suitable for a particular embodiment. Examples of suitable configurations to position a plurality of recesses include such that each recess of the plurality of recesses is equally spaced from more than one immediately adjacent recesses of the plurality of recesses, such that each recess of the plurality of recesses is equally spaced from more than two, three, four, or five immediately adjacent recesses of the plurality of recesses, such that each recess of the plurality of recesses is equally spaced from five immediately adjacent recesses of the plurality of recesses, such that each recess of the plurality of recesses is equally spaced from more than five immediately adjacent recesses of the plurality of recesses, each recess of the plurality of recesses is not equally spaced from more than one immediately adjacent recesses of the plurality of recesses, each recess of the plurality of recesses is equally spaced from all immediately adjacent recesses of the plurality of recesses, each recess of the plurality of recesses is not equally spaced from all immediately adjacent recesses of the plurality of recesses, a first recess is disposed a first distance from a second recess and the second recess is disposed a second distance that is different than the first distance from a third recess, and any other configuration considered suitable for a particular embodiment.

While each projection of the plurality of projections 114 has been illustrated as being releasably attached to the core 112 using threads 152, 160, a projection can be attached to a core using any suitable type of attachment and using any suitable technique or method of attachment. Selection of a suitable type of attachment and of a suitable technique or method of attachment between a projection and a core can be based on various considerations, including the material that forms a core and/or the material that forms a projection.

Examples of suitable types of attachment between a projection and a core include attachments in which a projection is releasably, or fixedly (e.g., such that separation of the two elements results in damage to one or both of the elements and the elements not being able to be re-attached to one another), attached to the core. Examples of techniques and methods of attachment considered suitable between a core and a projection include snap-fit attachments, threaded attachments, friction fit attachments, fusing a projection to a core, welding a projection to a core, soldering a projection to a core, brazing a projection to a core, using an adhesive between a projection and a core, attaching a projection within a recess defined by the main body of a core, attaching a projection to a surface of the main body of a core (e.g., exterior surface), and/or any other technique or method considered suitable for a particular embodiment. For example, a first projection of a plurality of projections can be attached to a core using a first type of attachment and a second projection of the plurality of projections can be attached to the core using a second type of attachment that is the same as, or different than, the first type of attachment. Alternatively, a first projection of a plurality of projections can be attached to a core using a first technique or method of attachment (e.g., threads) and a second projection of the plurality of projections can be attached to the core using a second technique or method of attachment (e.g., friction fit attachment) that is the same as, or different than, the first type of attachment.

Figure 6:
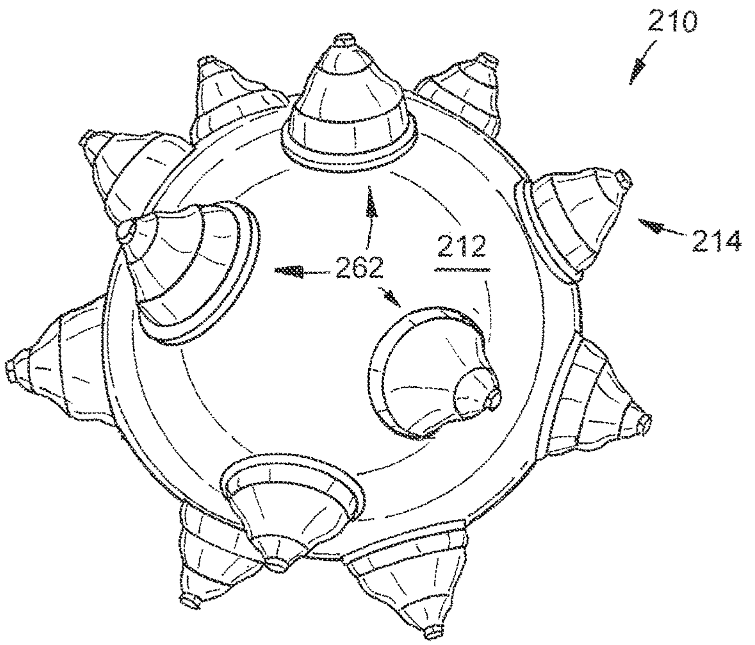
FIG. 6 is a perspective view of a third example impact tool.
Figure 7:
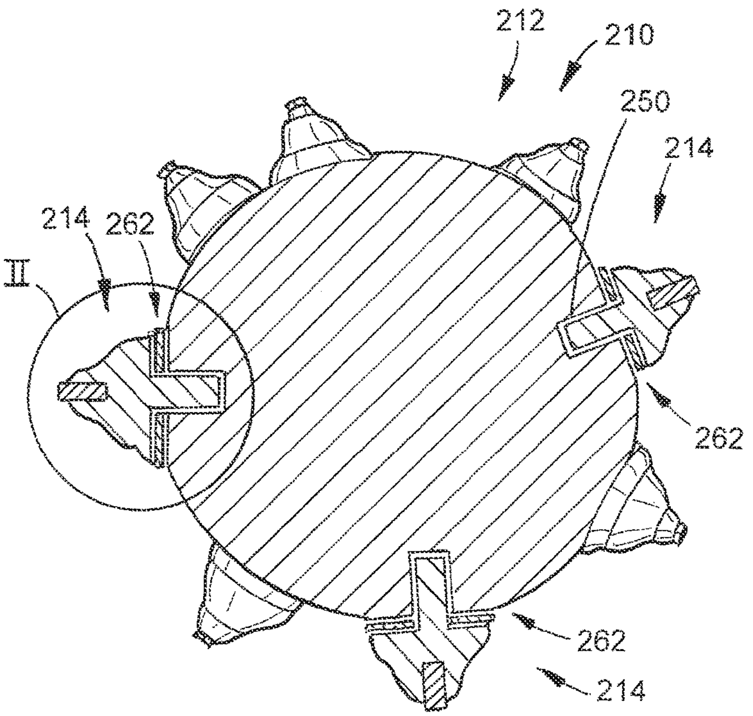
FIG. 7 is a cross-sectional view of the impact tool illustrated in FIG. 6 taken along a central lengthwise axis of the impact tool.
Figure 8:
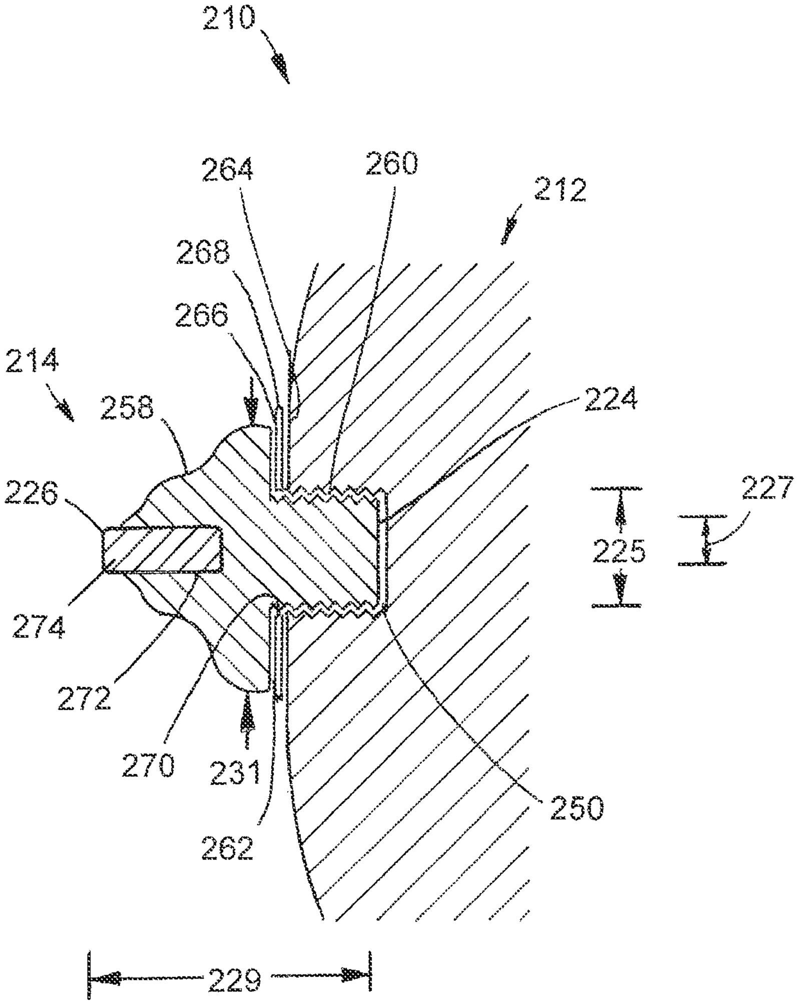
FIG. 8 is a magnified view of Area II shown in FIG. 7.

FIGS. 6, 7, and 8 illustrate a third example impact tool 210. The impact tool 210 is similar to the impact tool 110 illustrated in FIGS. 3, 4, and 5 and described above, except as detailed below. The impact tool 210 includes a core 212, a plurality of projections 214, and a plurality of washers 262.

In the illustrated embodiment, a washer of the plurality of washers 262 is disposed between the core 212 and each projection of the plurality of projections 214. As shown in FIG. 8, each washer of the plurality of washers 262 has a first end 264, a second end 266, and a main body 268 that defines a passageway 270 that extends from the first end 264 to the second end 266. The passageway 270 is sized and configured to receive a portion of a projection of the plurality of projections 214. It is considered advantageous to include a washer between each projection of the plurality of projections 214 and the core 212 at least because it provides a mechanism for increasing the attachment between each projection of the plurality of projections 214 and the core 212 and decreasing the movement between a projection of the plurality of projections 214 and the core 212.

While a washer of the plurality of washers 262 has been illustrated as disposed between each projection of the plurality of projections 214 and the core 212, an impact tool can include any suitable number of washers disposed between any suitable number of projections and the core. Selection of a suitable number of projections to include on an impact tool can be based on various considerations, including the type of attachment intended to be used between a projection and a core of the impact tool. Examples of suitable numbers of washers to include on an impact tool include one, at least one, two, a plurality, three, four, five, six, seven, eight, nine, ten, more than ten, and any other number considered suitable for a particular embodiment. Examples of suitable numbers of washers to position between a projection and a core include one, at least one, two, a plurality, three, four, five, more than five, and any other number considered suitable for a particular embodiment. A washer of a plurality of washers can be disposed between each projection of a plurality of projections and the core, between a set of projections of a plurality of projections, or any other number of projections of a plurality of projections.

While each washer of the plurality of washers 262 has been illustrated as having a particular structural arrangement, a washer can have any suitable structural arrangement and selection of a suitable structural arrangement for a washer can be based on various considerations, including the material forming the washer. Examples of structural arrangements considered suitable for a washer include any structural arrangement that defines a passageway sized and configured to receive a portion of a projection, such as spheres, cubes, cuboids, pyramids, cylinders, hexagonal prisms, triangular prisms, cones, rectangular prisms, and any other structural arrangement considered suitable for a particular embodiment. A washer included in an impact tool can be formed of any suitable material, such as stainless steel, any of the materials described herein, and any other material considered suitable for a particular embodiment.

In the illustrated embodiment, each projection of the plurality of projections 214 is releasably attached to the core 214 and a projection of the plurality of projections 214 is partially disposed within each recess of the plurality of recesses 250 defined by the core 212. As shown in FIG. 8, each projection of the plurality of projections 214 has a first end 224, a second end 226, a first diameter 225 at the first end 224, a second diameter 227 at the second end 226, a length 229 that extends from the first end 224 to the second end 226, a third diameter 231 disposed between the first end 224 and the second end 226, a main body 258 that defines a thread 260 and a recess 272, and a tip 274 disposed within the recess 272. The recess 272 extends from a location disposed between the second end 226 and the first end 224 toward the first end 224 and is sized and configured to receive a portion of a tip 274. The tip 274 is fixedly attached to the main body 258 within the recess 272.

In the illustrated embodiment, the core 212 is formed of a first material, the main body 258 of each projection of the plurality of projections 214 is formed of a second material, and the tip 274 of each projection of the plurality of projections 214 is formed of a third material. The first material is different than the second material and the third material. The second material is different than the third material. The first material is aluminum, the second material is stainless steel, and the third material is tungsten carbide. The first material has a first specific gravity and a first hardness. The second material has a second specific gravity and a second hardness. The third material has a third specific gravity and a third hardness. The first specific gravity is different than the second specific gravity and the third specific gravity. The second specific gravity is different than the third specific gravity. The first hardness is different than the second hardness and the third hardness. The second hardness is different than the third hardness. The first material has a first specific gravity between about 2.55 and about 2.8 and a first hardness between about 2.0 and about 2.9 using Mohs Hardness Scale. The second material has a second specific gravity equal to about 7.7 and a second hardness between about 5.0 and about 8.5 using Mohs Hardness Scale. The third material has a third specific gravity equal to about 14.29 and a third hardness between about 9.0 and about 9.5 using Mohs Hardness Scale.

The first material has a first color, the second material has a second color, and the third material has a third color. The first color is different than the second color and the third color. The second color is different than the third color. The first color is a neon color (e.g., highly visible to a human eye), the second color is a natural color of the material that forms each projection of the plurality of projections 214, and the third color is a natural color of the material that forms the tip 274.

It is considered advantageous to utilize an impact tool 210 that has a core formed of a first material, a plurality of projections 214 formed of a second material, and a tip 274 formed of a third material as described herein at least because such an impact tool provides a mechanism for damaging glass, or any other suitable material, from a position that is disposed a distance from the glass (e.g., more than one yard away from the material intended to be damaged). For example, the impact tools described herein can be utilized by throwing the impact tool at a material intended to be damaged. Unlike other devices, the inclusion of a tip provides a mechanism for damaging a material intended to contact the impact tool without having to form a large portion (e.g., majority of impact tool), or the entirety, of the impact tool of the material that forms the tip.

A tip can be formed of any suitable material having any suitable specific gravity and hardness. Selection of a suitable material, specific gravity, and/or hardness for a material that forms a tip can be based on various considerations, including the intended use of an impact tool of which the tip is intended to be included. Examples of materials considered suitable to form a tip include gold, silver, aluminum, zinc, copper, platinum, iron, nickel, steel, such as stainless steel, carbon steel, and hardened steel, glass, cobalt, titanium, chromium, silicon, a ceramic, such as cordierite, silicon nitride, a carbide, such as silicon carbide, tungsten carbide, cemented metal carbide, alumina, and zirconia, diamond, polycrystalline diamond, an alloy, combinations of the materials described herein, and/or any other material considered suitable for a particular embodiment. Examples of specific gravities of materials considered suitable to form a tip include specific gravities greater than, less than, equal to, or about 2.0, 2.33, 2.45, 2.5, 2.6, 2.72, 2.8, 3.2, 3.51, 3.9, 4.506, 6.0, 6.9, 7.03, 7.13, 7.2, 7.7, 7.8, 7.83, 7.8, 8.71, 8.89, 8.9, 10.5, 19.32, 21.45, between about 2.0 and about 22.0, between about 5.0 and about 17.0, between about 10.0 and about 12.0, and any other specific gravity considered suitable for a particular embodiment. Examples of hardnesses of materials considered suitable to form a tip include hardnesses that are measured using Mohs Hardness Scale that are equal to, less than, greater than, or about 2.0, 2.5, 2.9, 3.0, 4.0, 4.3, 4.5, 5.0, 6.0, 6.5, 7.0, 7.5, 8.0, 8.5, 9.0, 9.5, 10, between about 2.0 and about 10.0, between about 3.0 and about 9.0, between about 4.0 and 8.0, between about 5.0 and about 7.0, about 6.0, and any other hardnesses considered suitable for a particular embodiment.

While the tip 274 has been described as being fixedly attached to the main body 258 within the recess 272, a tip can be attached to a main body of a projection using any suitable type of attachment and using any suitable technique or method of attachment. Selection of a suitable type of attachment and of a suitable technique or method of attachment between a tip and a main body of a projection can be based on various considerations, including the material that forms a main body of a projection and/or the material that forms a tip. Examples of suitable types of attachment between a tip and a main body of a projection include attachments in which a tip is releasably, or fixedly (e.g., such that separation of the two elements results in damage to one or both of the elements and the elements not being able to be re-attached to one another), attached to a main body of a projection with a recess defined by the projection, attached to a surface of a main body of a projection (e.g., at the second end, an exterior surface), attached to a surface (e.g., exterior surface) of a main body of a core, and any other type of attachment considered suitable for a particular embodiment. Examples of techniques and methods of attachment considered suitable between a tip and a main body of a projection, or between a tip and a main body of a core, include snap-fit attachments, threaded attachments, friction fit attachments, fusing a tip to a main body of a projection, welding a tip to a main body of a projection, soldering a tip to a main body of a projection, brazing a tip to a main body of a projection, using an adhesive between a tip to a main body of a projection, liquefying a material desired to be used as a tip and applying (e.g., spraying, dipping) the material to a projection such that the tip is a coating on a portion, or the entirety, of a projection, and/or any other technique or method considered suitable for a particular embodiment. For example, a first tip can be attached to a main body of a first projection of a plurality of projections using a first type of attachment and a second tip can be attached to a main body of a second projection of the plurality of projections using a second type of attachment that is the same as, or different than, the first type of attachment. Alternatively, a first tip can be attached to a main body of a first projection of a plurality of projections using a first technique or method of attachment (e.g., welding the tip to the main body) and a second tip can be attached to a main body of a second projection of the plurality of projections using a second technique or method of attachment (e.g., friction fit attachment) that is the same as, or different than, the first type of attachment.

While the first material has been described as being different than the second material and the third material and the second material has been described as being different than the third material, the material that forms a core, a projection, and/or a tip can be the same or different from one another. Selection of a suitable material to form a core, a projection, and/or a tip can be based on various considerations, including the intended use of the impact tool on which the core, the projection, and/or the tip will be included. For example, a first material can be the same as, or different than, a second material and/or a third material, a second material can be the same as, or different than, a first material and/or a third material, and/or a third material can be the same as, or different than, a first material and/or a second material.

While the first color has been described as being different than the second color and the third color and the second color has been described as being different than the third color, the color of a core, a projection, and/or a tip can be the same or different from one another and can comprise any suitable color. Selection of a suitable color to include on a core, a projection, and/or a tip can be based on various considerations, including the intended use of the impact tool on which the core, the projection, and/or the tip is intended to be included. For example, a first color can be the same as, or different than, a second color and/or a third color, a second color can be the same as, or different than, a first color and/or a third color, and/or a third color can be the same as, or different than, a first color and/or a second color. Examples of colors considered suitable for a first color, a second color, and/or a third color include colors that are visible, or highly visible, to a human eye, colors that are not visible to a human eye but can be made visible using a device through which the first color, the second color, and/or third color are viewed, white, black, blue, blue-green, green, yellow-green, yellow, yellow-orange, orange, red-orange, red, red-violet, violet, blue-violet, blue, neon colors, any combination of colors described herein, natural colors of the material forming a core, a projection, or a tip, and any other color considered suitable for a particular embodiment. A color can be included in the material forming a core, a projection, and/or a tip (e.g., paint, additive), or can be applied to a core, a projection, and/or a tip subsequent to the core, the projection, and/or the tip being formed (e.g., using paint, stickers, powder coat).

Figure 9:
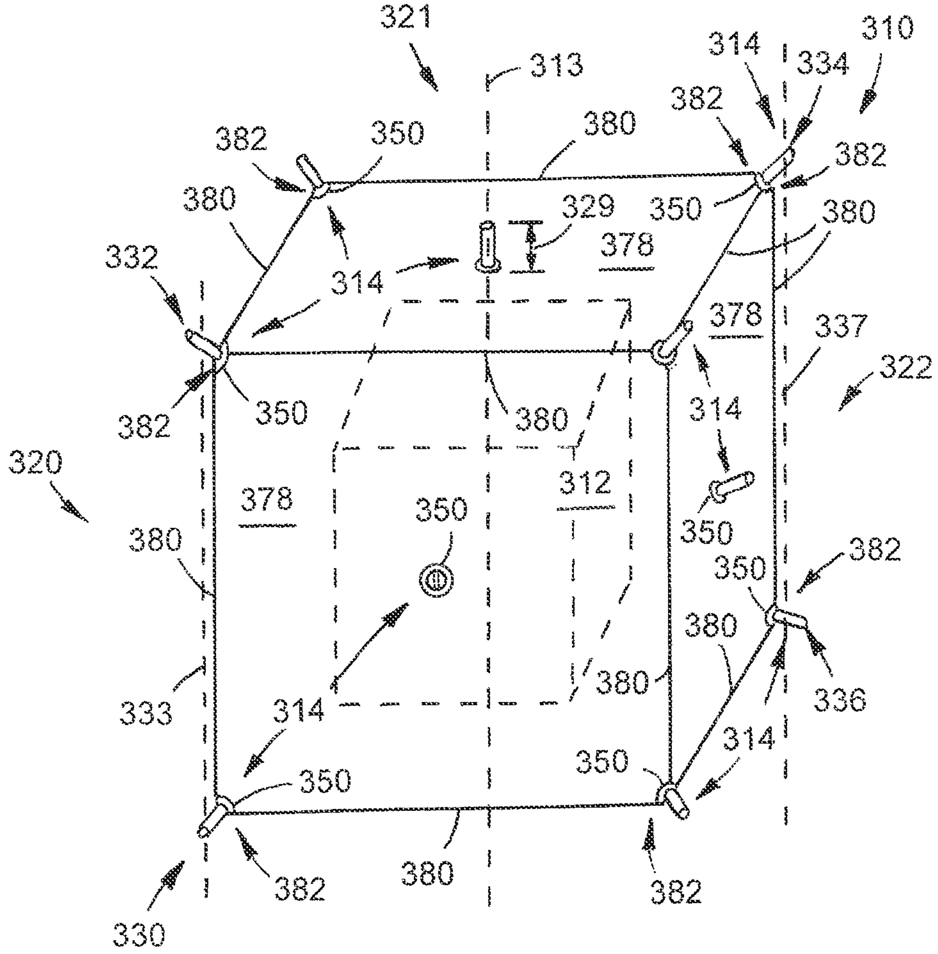
FIG. 9 is a perspective view of a fourth example impact tool.

FIG. 9 illustrates a fourth example impact tool 310. The impact tool 310 is similar to the impact tool 110 illustrated in FIGS. 3, 4, and 5 and described above, except as detailed below. The impact tool 310 includes a core 312 and a plurality of projections 314.

In the illustrated embodiment, the core 312 is formed as a hollow cuboid 321, each projection of the plurality of projections 314 is not equally spaced from all immediately adjacent projections of the plurality of projections 314, and each recess of the plurality of recesses 350 is not equally spaced from all immediately adjacent recesses of the plurality of recesses 350.

The core 312 has a plurality of sides 378, a plurality of edges 380, and a plurality of corners 382. A projection of the plurality of projections 314 is centrally disposed on each side of the plurality of sides 378 such that the lengthwise axis of the projection is disposed on an axis that extends through the center of the core 312. A projection of the plurality of projections 314 is disposed on each corner of the plurality of corners 382 such that the lengthwise axis of the projection is disposed on an axis that extends through the center of the core 312.

The plurality of projections 314 is configured on the core 312 such that at least two projections (e.g., a first projection 330 of the plurality of projections 314 and a second projection 332 of the plurality of projections 314) intersect a first hypothetical plane 333 disposed on the first side 320 of the core 312 and at least two projections (e.g., a third projection 334 of the plurality of projections 314 and a fourth projection 336 of the plurality of projections 314) intersect a second hypothetical 337 plane disposed on the second side 322 of the core 312 and that is opposably facing the first side 320 relative to the central lengthwise axis 313. Each of the first hypothetical plane 333 and the second hypothetical plane 337 does not contact the core 312 and extends parallel to the central lengthwise axis 313 of the core 312 and is disposed a distance from the central lengthwise axis 313 that is greater than the radius 317 of the core 312 and less than the sum of the radius 317 of the core 312 and the length 329 of a projection of the plurality of projections 314.

While a projection of the plurality of projections 314 has been illustrated as being centrally disposed on each side of the plurality of side 378 and a projection of the plurality of projections 314 has been illustrated as being disposed on each corner of the plurality of corners 382, any suitable number of projections can be disposed on a side, or corner, of a core and any suitable number of corners of a core can include a projection. Selection of a suitable configuration for a plurality of projections can be based on various considerations, including the intended use of an impact tool on which the projections are included. For example, a side of a core can include any suitable number of projections (e.g., one, at least one, two, a plurality) and every corner, a plurality of corners, or a single corner of a core can include a projection.

While a projection of the plurality of projections 314 has been illustrated as being centrally disposed on each side of the plurality of side 378 such that the lengthwise axis of the projection is disposed on an axis that extends through the center of the core 312 and a projection of the plurality of projections 314 has been illustrated as being disposed on each corner of the plurality of corners 382 such that the lengthwise axis of the projection is disposed on an axis that extends through the center of the core 312, a projection can be oriented in any suitable position on a core. Selection of a suitable position to orient a projection on a core can be based on various considerations, including the intended use of the impact tool on which the projection is included. For example, a projection can be disposed on a core such that the lengthwise of the projection is disposed on an axis that extends through the center of a core, does not extend through the center of a core, is disposed a distance from the center of a core that is equal to, less than, or greater than, the radius of a core, and any other orientation considered suitable for a particular embodiment.

Figure 10:
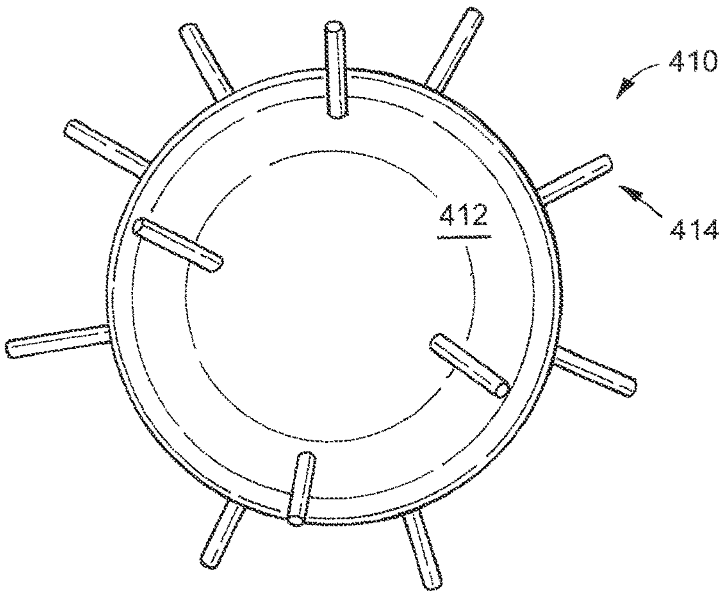
FIG. 10 is a perspective view of a fifth example impact tool.
Figure 11:
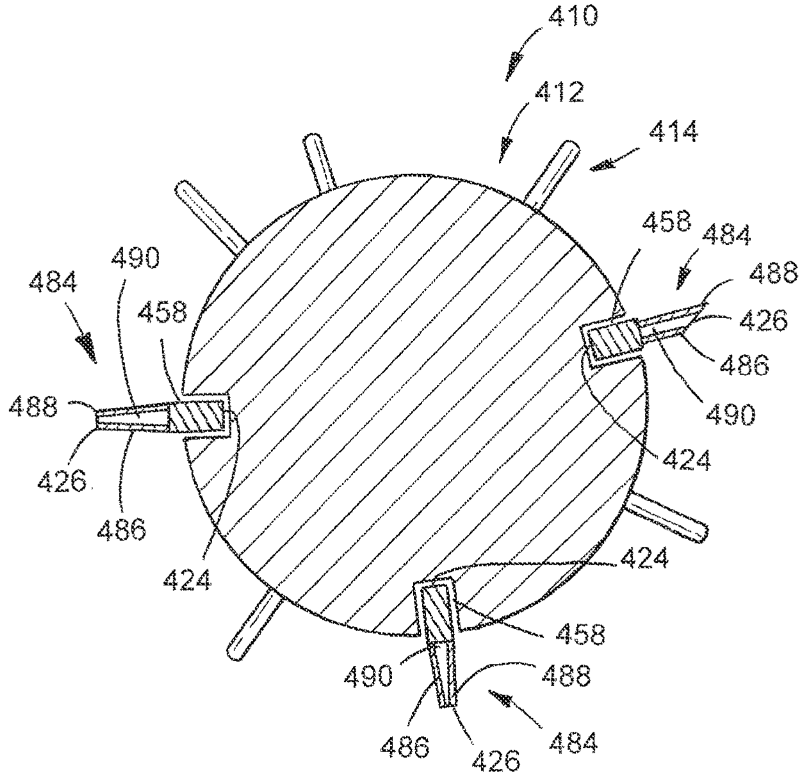
FIG. 11 is a cross-sectional view of the impact tool illustrated in FIG. 10 taken along a central lengthwise axis of the impact tool.

FIGS. 10 and 11 illustrate a fifth example impact tool 410. The impact tool 410 is similar to the impact tool 110 illustrated in FIGS. 3, 4, and 5 and described above, except as detailed below. The impact tool 410 includes a core 412 and a plurality of projections 414.

In the illustrated embodiment, each projection of the plurality of projections 414 comprises a needle 484 attached to the main body 458. Each needle 484 extends from the second end 426 toward the first end 424 and has a main body 486 that defines a sharp tip 488 at the second end 426 and a passageway 490 sized and configured to receive a portion of material, such as tissue in embodiments in which the impact tool 410 is used to obtain tissue samples from large mammals. Optionally, an impact tool, such as the impact tool 410 illustrated in FIGS. 10 and 11, can include a sleeve on each projection of the plurality of projections that is adapted to move between a first position and a second position. In the first position, the sleeve is disposed over a portion of the projection (e.g., the sharp tip, the second end) and in the second position the sleeve is free of the portion of the projection (e.g., the sharp tip, the second end).

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A throwable impact tool comprising:

a core having a radius, a center, a central lengthwise axis, a first side, and a second side opposably facing the first side relative to the central lengthwise axis, the radius being less than 2.5 inches; and a plurality of projections, each projection of the plurality of projections extending from the core and having a first end, a second end, a length extending from the first end to the second end, and a solid cross-sectional shape, each projection of the plurality of projections tapering from the first end to the second end, the plurality of projections configured on the core such that a first projection and a second projection are disposed on the first side of the core and intersect a first hypothetical plane and a third projection and a fourth projection are disposed on the second side of the core and intersect a second hypothetical plane that is different than the first hypothetical plane, each of the first hypothetical plane and the second hypothetical plane being free of contact with the core and disposed a distance from the center of the core that is greater than the radius of the core and less than a sum of the radius of the core and the length of a projection of the plurality of projections, the first projection and the second projection positioned such that the first projection is disposed on a cross-section taken along the central lengthwise axis of the core and the second projection is not disposed on the cross-section taken along the central lengthwise axis of the core;

wherein the plurality of projections includes more than fifteen projections; and wherein the core and each projection of the plurality of projections are formed of steel.

2. The impact tool of claim 1, wherein the radius is between about 0.25 inches and 2.5 inches.

3. The impact tool of claim 1, wherein the radius is less than 1 inch.

4. The impact tool of claim 1, wherein the plurality of projections is configured on the core such that a fifth projection intersects the first hypothetical plane and a sixth projection intersects the second hypothetical plane.

5. The impact tool of claim 1, wherein the third projection and the fourth projection are positioned such that the third projection is disposed on the cross-section taken along the central lengthwise axis of the core and the fourth projection is not disposed on the cross-section taken along the central lengthwise axis of the core.

6. The impact tool of claim 1, wherein a fifth projection of the plurality of projections is disposed a first distance from a sixth projection of the plurality of projections; and wherein the sixth projection of the plurality of projections is disposed a second distance from a seventh projection of the plurality of projections that is different than the first distance.

7. The impact tool of claim 1, wherein each projection of the plurality of projections has a hard edge.

8. The impact tool of claim 1, wherein each projection of the plurality of projections has a rounded point.

9. The impact tool of claim 1, wherein the plurality of projections includes thirty projections.

10. The impact tool of claim 1, wherein the core and each projection of the plurality of projections are formed as a single piece of material.

11. The impact tool of claim 1, wherein each projection of the plurality of projections is equally spaced from more than one immediately adjacent projections of the plurality of projections.

12. The impact tool of claim 1, wherein each projection of the plurality of projections is not equally spaced from more than one immediately adjacent projections of the plurality of projections.

13. The impact tool of claim 1, wherein each of the first hypothetical plane and the second hypothetical plane is parallel to the central lengthwise axis.

14. The impact tool of claim 1, wherein the core and plurality of projections are formed by casting.

15. The impact tool of claim 1, wherein the core is solid.

16. The impact tool of claim 1, wherein each projection of the plurality of projections is multifaceted.

17. The impact tool of claim 1, wherein the core is a sphere.

18. The impact tool of claim 1, wherein the core and each projection of the plurality of projections are formed as a single piece of casted material.

19. A throwable impact tool comprising:

a solid core having a radius, a center, a central lengthwise axis, a first side, and a second side opposably facing the first side relative to the central lengthwise axis, the radius being less than 1 inch; and a plurality of projections, each projection of the plurality of projections extending from the core and having a first end, a second end, a length extending from the first end to the second end, and a solid cross-sectional shape, each projection of the plurality of projections tapering from the first end to the second end, the plurality of projections configured on the core such that a first projection and a second projection are disposed on the first side of the core and intersect a first hypothetical plane and a third projection and a fourth projection are disposed on the second side of the core and intersect a second hypothetical plane that is different than the first hypothetical plane, each of the first hypothetical plane and the second hypothetical plane being free of contact with the core and disposed a distance from the center of the core that is greater than the radius of the core and less than a sum of the radius of the core and the length of a projection of the plurality of projections, the first projection and the second projection positioned such that the first projection is disposed on a cross-section taken along the central lengthwise axis of the core and the second projection is not disposed on the cross-section taken along the central lengthwise axis of the core, the third projection and the fourth projection positioned such that the third projection is disposed on the cross-section taken along the central lengthwise axis of the core and the fourth projection is not disposed on the cross-section taken along the central lengthwise axis of the core;

wherein the plurality of projections includes more than fifteen projections;

wherein the core and each projection of the plurality of projections are formed of steel; and wherein the core and each projection of the plurality of projections are formed as a single piece of material.

20. A throwable impact tool comprising:

a solid core having a radius, a center, a central lengthwise axis, a first side, and a second side opposably facing the first side relative to the central lengthwise axis, the radius being less than 1 inch; and a plurality of projections, each projection of the plurality of projections being multifaceted, extending from the core, and having a first end, a second end, a length extending from the first end to the second end, and a solid cross-sectional shape, each projection of the plurality of projections tapering from the first end to the second end, each projection of the plurality of projections equally spaced from more than one immediately adjacent projections of the plurality of projections, the plurality of projections configured on the core such that a first projection and a second projection are disposed on the first side of the core and intersect a first hypothetical plane and a third projection and a fourth projection are disposed on the second side of the core and intersect a second hypothetical plane that is different than the first hypothetical plane, each of the first hypothetical plane and the second hypothetical plane being free of contact with the core and disposed a distance from the center of the core that is greater than the radius of the core and less than a sum of the radius of the core and the length of a projection of the plurality of projections, the first projection and the second projection positioned such that the first projection is disposed on a cross-section taken along the central lengthwise axis of the core and the second projection is not disposed on the cross-section taken along the central lengthwise axis of the core, the third projection and the fourth projection positioned such that the third projection is disposed on the cross-section taken along the central lengthwise axis of the core and the fourth projection is not disposed on the cross-section taken along the central lengthwise axis of the core;

wherein the plurality of projections includes more than fifteen projections;

wherein the core and each projection of the plurality of projections are formed of steel; and wherein the core and each projection of the plurality of projections are formed as a single piece of material.

* * * * *